Feb. 19, 1963   R. C. JUNG ETAL   3,077,749
REFRIGERATOR AIR FLOW ARRANGEMENT
Filed Nov. 30, 1960   2 Sheets-Sheet 1
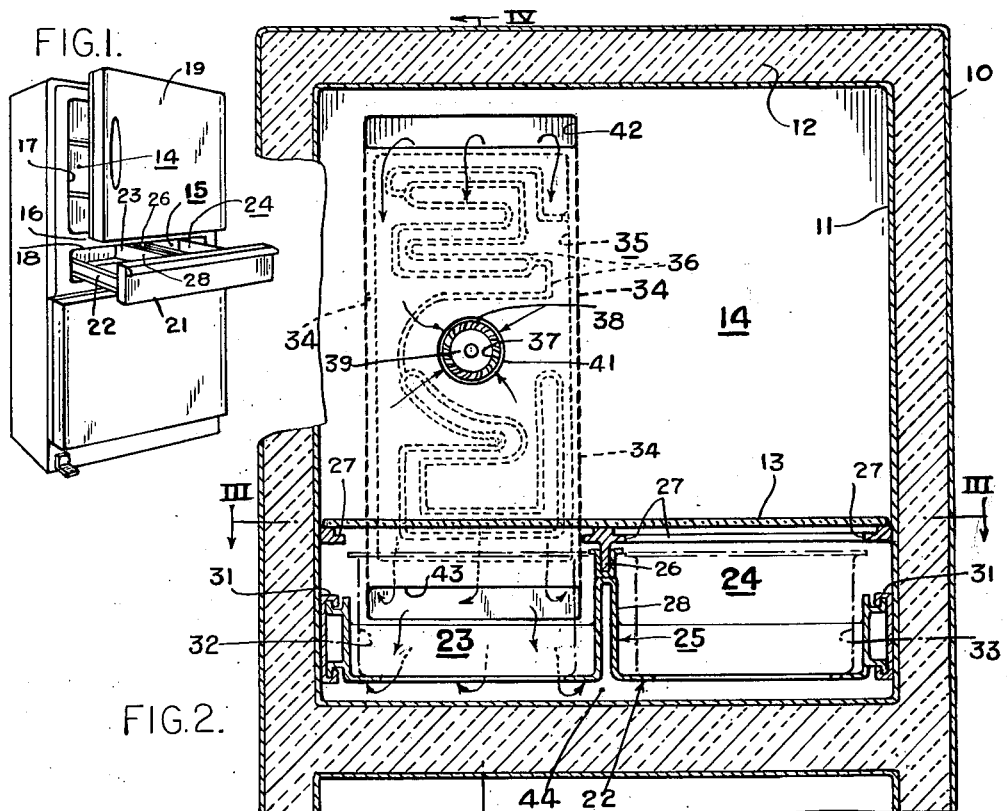
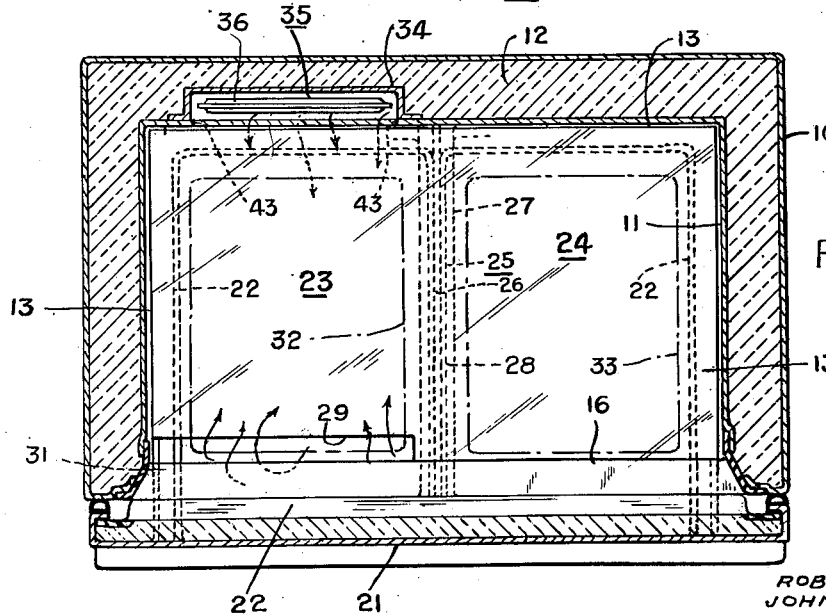
INVENTORS
ROBERT C. JUNG
JOHN H. TUPPER
BY Edward A. Sager
ATTORNEY Feb. 19, 1963    R. C. JUNG ETAL    3,077,749
REFRIGERATOR AIR FLOW ARRANGEMENT
Filed Nov. 30, 1960    2 Sheets-Sheet 2

INVENTORS
ROBERT C. JUNG
JOHN H. TUPPER
BY Edward A. Sager
ATTORNEY

United States Patent Office 3,077,749
Patented Feb. 19, 1963

3,077,749
REFRIGERATOR AIR FLOW ARRANGEMENT
Robert C. Jung, Columbus, and John H. Tupper, Grove City, Ohio, assignors to Westinghouse Electric Corporation, East Pittsburgh, Pa., a corporation of Pennsylvania
Filed Nov. 30, 1960, Ser. No. 72,693
4 Claims. (Cl. 62—419)

This invention pertains to a refrigerator having a plurality of food storage zones to be maintained at various temperatures and has for an object to provide an improved refrigerator of this kind.

A further object of the invention is to provide improved means for refrigerating the general storage area, the meat storage chamber, and the vegetable storage chamber of a domestic refrigerator at various temperatures optimum for the preservation of the stored food.

The invention is particularly applicable to a domestic refrigerator wherein the cabinet structure encloses a relatively large, general storage compartment and a pair of smaller chambers, one of the chambers being a low temperature meat storage chamber and the other being employed for the storing of vegetables at higher temperature. The general storage compartment is maintained at a temperature approximating 38 degrees F. The temperature of the vegetable chamber is of the order of 34 degrees F. and the temperature of the meat storage chamber is maintained at approximately 30 degrees F.

In accordance with the invention, an air cooling element is arranged in a duct structure having one port for the discharge of cold air to the upper region of the general storage compartment and a second port for discharge of air to the low temperature meat chamber. A fan having its inlet communicating with an intermediate region of the general storage compartment delivers air to the duct for passage over the cooling element prior to its discharge through the air discharge ports. The air passing through the meat chamber abstracts heat therefrom and passes through an opening for mixture with the air in the general storage compartment. The vegetable chamber is substantially isolated from the general storage compartment and the arrangement is such that circulation of air between this chamber and the meat storage chamber is restricted. Accordingly, cooling of the air in the vegetable chamber is effected primarily by conducting heat therefrom to the cold air passing through the low temperature meat storage chamber.

The temperature of the air cooling element and the operation of the fan are controlled to maintain the general storage compartment at proper temperature, and the rate of air delivery to the meat compartment is such that a temperature is maintained therein that is lower than the temperature in the general storage compartment. During inactive periods of the fan, or when the temperature of the general storage compartment is at its proper value, some circulation of cold air through the meat chamber is maintained by natural convection.

The foregoing and other objects are effected by the invention as will be apparent from the following description and claims taken in connection with the accompanying drawings, forming a part of this application, in which:

FIG. 1 is a perspective of a domestic refrigerator incorporating the present invention;

FIG. 2 is a vertical section taken through the upper portion of the cabinet shown in FIG. 1; and FIGS. 3 and 4 are, respectively, sections taken along the lines III—III and IV—IV of FIG. 2.

Figure 4:
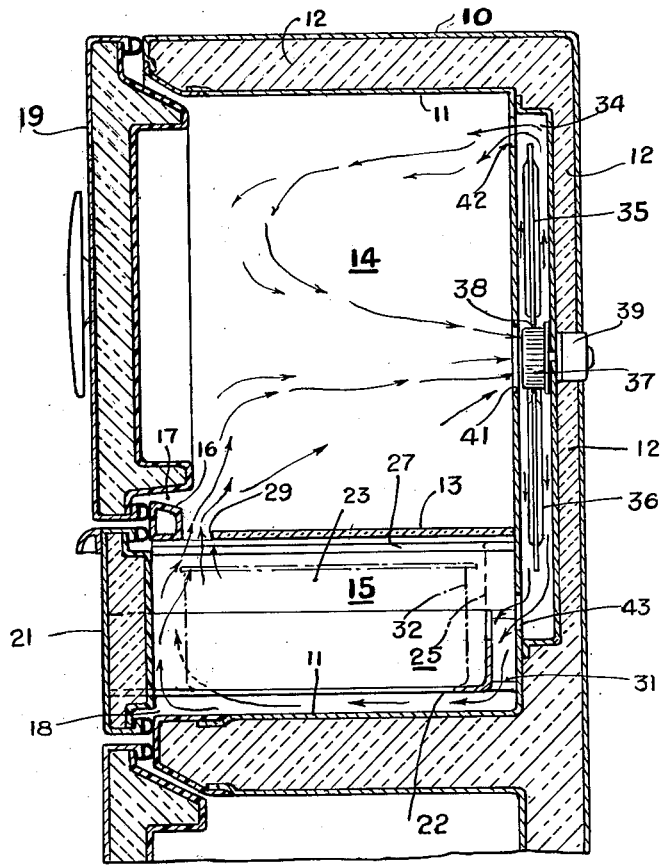

Referring now to the drawings, an election has been made to disclose this invention applied to a refrigerator of the domestic type and including a cabinet having an outer shell 10, an inner liner 11 nested therein and heat insulation 12 therebetween. The liner 11 encloses a refrigerated space that is divided by a horizontal partition 13 into a relatively large general, or primary, food storage compartment 14 and a smaller compartment 15 beneath the partition. A mullion 16 extends across the front of the cabinet and separates front access openings 17 and 18 for the respective compartments 14 and 15. A suitable hinged, insulated door 19 closes the opening 17 and an insulated front panel 21 of a retractable drawer structure 22 closes the lower opening 18. While a refrigerator of the drawer type is disclosed, it will be understood that the invention is applied equally well to other forms of cabinets, such as conventional types wherein a common door provides access to both compartments 14 and 15.

In accordance with the invention, the lower compartment 15 is divided to provide a low temperature, meat storage chamber 23 and a higher temperature vegetable storage chamber 24 by means of a vertical baffle structure 25. The latter may include a fixed flange 26 depending from a frame 27 that carries the partition 13; which frame 27 is suitably supported within the liner 11. A second movable portion 28 of the baffle 25 is carried by the drawer 22 and complements the flange 26. It will be noted that the flange 26 and portion 28 of the baffle 25 extend from the drawer panel 21 to the rear wall of the liner 11 in the closed position of the drawer 22 as shown. The partition 13 closely fits within the liner 11 and isolates the compartment 14 from the vegetable storage chamber 24. However, the partition 13 is formed to provide an air passage 29 for the delivery of air from the low temperature chamber 23 to the compartment 14 as referred to hereinafter. It will be understood that the drawer 22 is retractable upon rails 31 to an open position; which rails 31 are fixed within the lower compartment 15 in any suitable manner. A meat pan 32 and vegetable pan or crisper 33, shown in dot and dash lines, are carried by the drawer 22 in the respective side-by-side chambers 23 and 24. These pans are of conventional construction and carry lids, not shown, for completely enclosing the products stored therein whereby dehydration of the products is minimized, all of which is well understood.

Considering now the refrigerating means for the various zones, a vertical duct 34 is formed on the rear of the liner 11 within the insulation 12 and a refrigerated plate 35 is disposed within the duct 34 for cooling air passed therethrough. The plate 35 is provided with a serpentine passage 36 through which a refrigerant is circulated. As the particular means for circulating the refrigerant in the passage 36 and the means for controlling the same form no part of this invention, they have not been shown for the sake of brevity. However, it might be said that, usually in domestic machines, a compressor-condenser-expander system is used and control of its operation is in accordance with the temperature of the refrigerated plate 35. In the present case, the plate 35 operates between temperatures of approximately 10 degrees F. and 35 degrees F. so that defrosting occurs with each cycle.

Circulation of air over the plate 35 for cooling the air is effected by a blower, the impeller 37 of which is disposed in a hole 38 formed in an intermediate portion of the plate. The impeller 37 is rotated by a motor 39 supported in any suitable manner adjacent the duct 34. Air from the compartment 14 passes to the impeller 37 through an opening 41 formed in the back of the liner 11. The impeller 37 functions to project air radially outwardly in all directions over the plate 35 and the cooled air exits from the duct through air discharge ports 42 and 43 formed in the liner. From one port 42 cool air is introduced to an upper region of the compartment 14, and from the other port 43 cool air is discharged into the low temperature chamber 23 and directly upon the meat pan 32. After abstracting heat from the chamber 23 and from chamber 24, as described later, the air discharged by the port 43 passes through passage 29 and moves with air from the compartment 14 through the opening 38 to the impeller 37 of the blower for recirculation.

As set forth, the vegetable chamber 24 is isolated from the upper main compartment 14 by the partition 13 so that, there can be no forced circulation of air through the chamber 24 by operation of the blower impeller 37. However, heat is abstracted from the air in the vegetable chamber 24 primarily by conduction to the stream of cold air passing through the low temperature chamber 23. The flow of heat to this cold air stream is through the baffle structure 25 or directly through a restricted layer of air 44 between the drawer 22 and the bottom wall of liner 11. It is pointed out, however, that the air in the chamber 24 ambient the vegetable pan 33 is quiescent compared to the flow of cold air through the chamber 23. Accordingly, heat is abstracted from the meat pan 32 in chamber 23 at a higher rate than from the vegetable pan 33 in chamber 24 during operation of the blower impeller 37 so that the temperature of the air in chamber 23 is lower than that prevailing in chamber 24.

As set forth, the temperature of the plate 35 is controlled between 10 degrees F. and 35 degrees F. Preferably, operation of the blower motor 39 is responsive to the temperature of the air in the main storage compartment 14 to provide a mean temperature of 38 degrees F. therein. The amount of cold air translated to the low temperature meat storage chamber 23 is predetermined to provide a mean air temperature of the order of 30 degrees F. therein. The rate of heat transfer between the chambers 23 and 24 is predetermined to provide a higher temperature in chamber 24 of the order of 34 degrees F. The temperature in chamber 23 is stabilized regardless of the demands for cooling in the main compartment as the arrangement of air ports 42 and 43 provides for natural convection cold air currents over the plate 35 and through the chamber 23 during inactive periods of the impeller 37.

From the foregoing, it will be apparent that an improved, simplified refrigerator is provided wherein various zones are refrigerated to provide different temperatures that are optimum for the food stored therein. The meat storage chamber and the vegetable storage chamber are, for convenience, contiguous and the required temperature difference for these foods is obtained in a novel and simplified manner.

While the invention has been shown in but one form, it will be obvious to those skilled in the art that it is not so limited, but is susceptible of various changes and modifications without departing from the spirit thereof.

What is claimed is:

1. In a refrigerator, the combination of a cabinet structure enclosing a primary food storage compartment and a pair of auxiliary chambers disposed side by side and adjacent one side of the primary compartment, one of said chambers being adapted for the storage of food at relatively low temperature and the other chamber being adapted for the storage of food at a higher temperature, said cabinet structure including a passage for the free flow of air from the low temperature chamber to the primary food storage compartment, means associated with the cabinet structure for limiting circulation of air through the higher temperature chamber, a duct structure having first and second air discharge ports communicating, respectively, with said food storage compartment and the low temperature chamber, a blower for translating air from the primary food storage compartment to said duct and a refrigerating element arranged within the duct for cooling the air translated therethrough to said primary food compartment and the low temperature chamber; the construction and arrangement being such that heat is abstracted from the air in said higher temperature chamber primarily by conduction to the cooled air circulated through the low temperature chamber.

2. In a refrigerator, the combination of a cabinet enclosing a space to be refrigerated, a baffle structure disposed in a lower region of the space and dividing the space into a relatively large main storage compartment and a pair of relatively small, low and higher temperature chambers disposed side by side beneath said compartment, said baffle structure having a passage providing for flow of air from the low temperature chamber to said compartment but being otherwise substantially imperforate for isolating the higher temperature chamber from the compartment, a fan for drawing air from an intermediate portion of said compartment, a duct structure for receiving air from the fan and having first and second air discharge ports communicating, respectively, with an upper region of the compartment and the low temperature chamber, means arranged within the duct for refrigerating the air passed therethrough, and means associated with said baffle structure for impeding flow of air from the higher temperature chamber to the cold air circulated through the low temperature chamber.

3. In a refrigerator, the combination of a cabinet having an outer shell, an inner liner nested in the shell and heat insulation therebetween, said liner enclosing a space to be refrigerated, a baffle structure in said space for dividing the latter into a relatively large, main food storage compartment and a pair of smaller chambers therebeneath, one of said chambers being adapted for storage of food at relatively low temperature and the other chamber being adapted to store food at a higher temperature, said baffle structure having a passage providing for flow of air from the lower temperature chamber to the main compartment, means associated with said liner for providing an air cooling duct extending from adjacent an upper portion of the compartment to adjacent said low temperature chamber, a fan for translating air from the compartment to an intermediate portion of the duct, a refrigerating element in said duct for cooling air translated therethrough, means forming upper and lower ports in the duct for delivering cooled air to the compartment and the low temperature chamber, respectively, and means associated with the baffle for limiting circulation of air between said chambers, the construction and arrangement being such that heat is abstracted from the air in the higher temperature chamber primarily by conduction to the cold air circulated through the low temperature chamber.

4. In a refrigerator, the combination of a cabinet having insulated side and rear walls forming an open front space, a generally horizontal platform within said space and dividing the space into an upper, relatively large main food storage compartment and a lower, smaller compartment, a door closing the front of the upper compartment, a drawer structure disposed within said lower compartment, means supporting the drawer structure for movement into and out of the lower compartment, a baffle carried by the drawer intermediate its sides and dividing the lower compartment into a low and higher temperature chamber in the closed position of the drawer, means forming a passage for air between the low temperature chamber and the upper main compartment, a blower for withdrawing air from the upper compartment, a duct receiving air from the blower, means within the duct for refrigerating air passed therethrough, said duct having first and second air discharge ports for delivering cold air to the upper main compartment and to the low temperature chamber, respectively and means associated with said baffle for limiting flow of air between said chambers, the construction and arrangement being such that heat is abstracted from the air in said higher temperature chamber primarily by conduction to the cold air circulated through the low temperature chamber.

References Cited in the file of this patent

UNITED STATES PATENTS

| | | |
|---|---|---|
| 2,826,046 | Tobiasz | Mar. 11, 1958 |
| 2,907,180 | Mann | Oct. 6, 1959 |
| 2,960,849 | O'Connell | Nov. 22, 1960 |